(12) United States Patent
Posabella et al.

(10) Patent No.: US 7,827,104 B2
(45) Date of Patent: Nov. 2, 2010

(54) METHOD AND SYSTEM FOR EFFICIENTLY BILLING ON-DEMAND SERVICE EXPLOITATION IN COMPUTER NETWORKS

(75) Inventors: Giovanni Posabella, Villaricca (IT); Adele Trombetta, Meta (IT); Alfredo Vertullo, Marano Di Napoli (IT)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 11/086,594

(22) Filed: Mar. 22, 2005

(65) Prior Publication Data

US 2005/0229219 A1 Oct. 13, 2005

(30) Foreign Application Priority Data

Mar. 25, 2004 (EP) .................................. 04368017

(51) Int. Cl.
  G06Q 40/00 (2006.01)
  G06F 15/16 (2006.01)
(52) U.S. Cl. ........................................ 705/40; 709/229
(58) Field of Classification Search .............. 705/35–42
  See application file for complete search history.

(56) References Cited

U.S. PATENT DOCUMENTS

| | | | | |
|---|---|---|---|---|
| 5,751,956 | A * | 5/1998 | Kirsch | 709/203 |
| 6,047,051 | A * | 4/2000 | Ginzboorg et al. | 379/130 |
| 6,836,797 | B2 * | 12/2004 | Givoly et al. | 709/223 |
| 6,907,406 | B2 * | 6/2005 | Suzuki | 705/52 |
| 7,370,013 | B1 * | 5/2008 | Aziz et al. | 705/40 |
| 2002/0083003 | A1 * | 6/2002 | Halliday et al. | 705/52 |
| 2002/0091854 | A1 * | 7/2002 | Smith | 709/236 |
| 2002/0178271 | A1 * | 11/2002 | Graham et al. | 709/229 |
| 2003/0046409 | A1 * | 3/2003 | Graham | 709/229 |
| 2003/0128991 | A1 * | 7/2003 | Carling et al. | 399/8 |
| 2003/0158816 | A1 * | 8/2003 | Rouse | 705/51 |
| 2004/0008688 | A1 * | 1/2004 | Matsubara et al. | 370/395.21 |

OTHER PUBLICATIONS

Dreier, Troy. "Full MusicNow; The newest version of FullAudio MusicNow is a definite improvement; but that's not quite enough to make it the best choice around" PC Magazine, New York: Aug. 5, 2003. vol. 22 Iss. 13; p. 138.*
"Full Audio Unveils its Vision for Digital Music, Staking its Claim on an Untapped market", PR Newswire. New York: Feb. 17, 2003. p. 1.*
Galla, Preston, How the Internet Works, Macmillan Computer Publishing company, Aug. 1999, p. 157.*
Galla, Preston, How the Internet Works, Macmillan Computer Publishing company, Aug. 1999, p. 157.*
"Sabre cries foul at Air Canada", Rick Westhead. The Spectator. Hamilton. Ont: Sep. 23, 2003. p. B.02.*
"Highdeal Signs Global Business Agreement with HP; End-to-End Solution Helps Enable HP to Deliver Flexible Pricing and Billing Solutions to Next Generation Service Providers", Business Editors/High Tech Writers. Business Wire. New York: Dec 10, 2002. p. 1.*
"Pricing considerations for delivering e-content on-demand", Srinivasan, Jagannathan, University of California, Santa Barbara, 2003, 191 pages.*

* cited by examiner

Primary Examiner—Ella Colbert
Assistant Examiner—Mohammad Z Shaikh
(74) Attorney, Agent, or Firm—Joseph Petrokaitis

(57) ABSTRACT

On-demand services are hosted for customers and offered to users of a computer network. Incoming access requests from users are identified as on-demand service access requests. On-demand service usage data is updated to indicate usage of the on-demand services by the users. Customers are billed for on-demand service usage by the users.

15 Claims, 6 Drawing Sheets

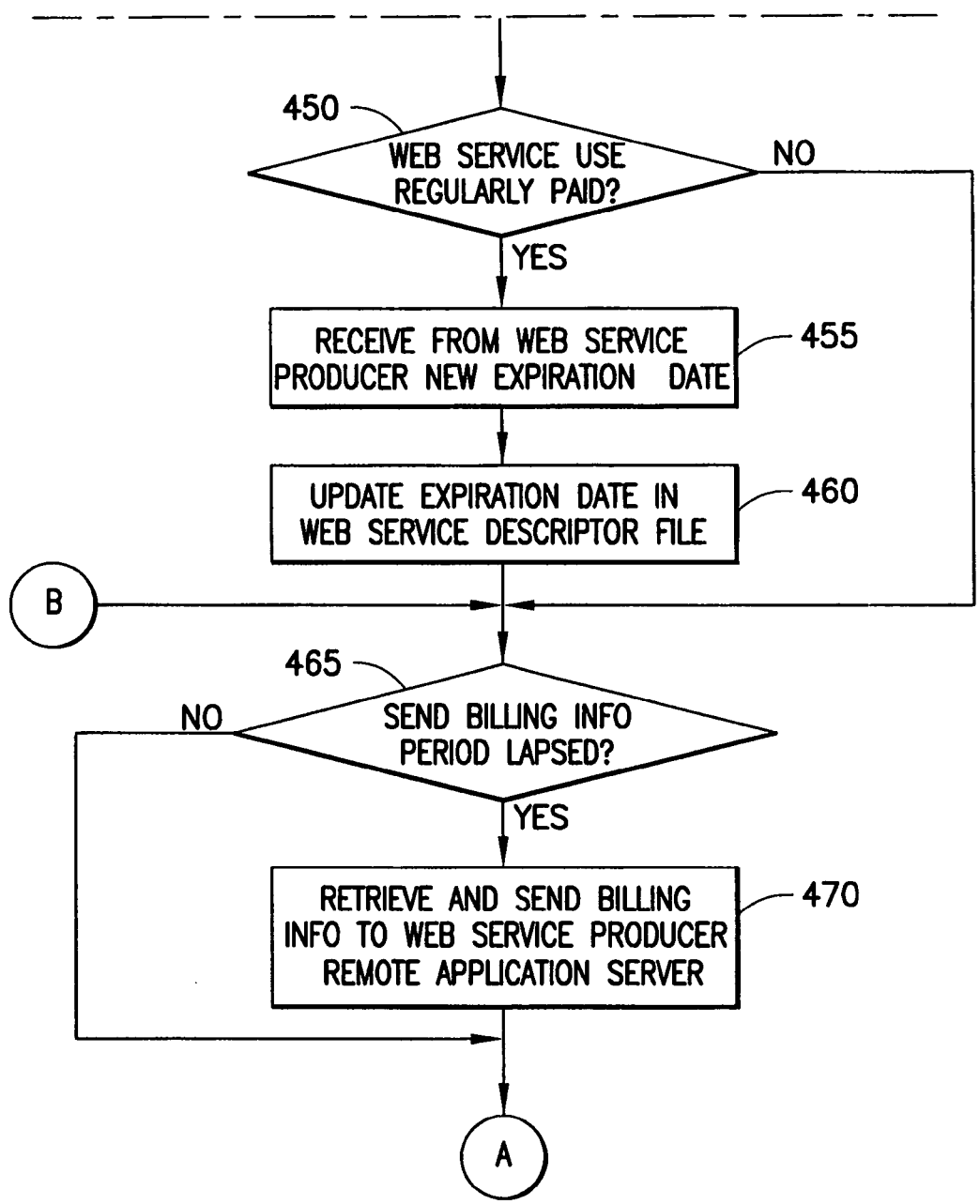

METHOD AND SYSTEM FOR EFFICIENTLY BILLING ON-DEMAND SERVICE EXPLOITATION IN COMPUTER NETWORKS

TECHNICAL FIELD

The present invention generally relates to the field of data processing apparatuses and the implementation of e-business in computer networks and, more particularly to a method and system for billing the exploitation of on-demand services.

BACKGROUND OF THE INVENTION

One of the newest approaches to the provisioning of products and services, especially those made available through data communications networks such as the Internet, involves a real change of paradigm.

Formerly, customers were expected to pay for the acquisition of a given product or service. This meant, for example, that customers had to purchase a given product or service of interest to them, forever or possibly for time periods of predetermined length (e.g. one year).

This approach exhibits some advantages. For example, after purchasing the product or service, the customer can take advantage of it by using the product or exploiting the service at any time, without having to incur further expenses for product or service acquisition. However, the customer has to pay for the product or service even if the service is not actually exploited. The payment is made in respect of the mere potential possibility of exploiting the product or service, irrespective of the fact that the product or service is exploited or not. The purchase cost of the product or service thus becomes a fixed cost for the customer's organization.

In the alternative, so-called "pay-per-use" or "pay-as-you-go" approach, customers are, on the contrary, allowed to pay for a product or service to the extent they actually exploit it, and not for the mere potential possibility of using it. This different approach is perceived as capable of allowing a cost reduction. This approach is therefore often preferred, especially whenever the product or service to be exploited is not directly connected to the core business of an organization.

The pay-per-use approach to the provisioning of products or services may probably have taken its inspiration from our daily, common-life experience of using services such as some of those available at home (e.g. the use of electric power or of gas for cooking burners or boilers). Switching a television set on will result in a charge for the use of electric power. Charging will stop as soon as the television set is switched off.

Starting from these traditional applications, the trend now goes in the direction of extending the pay-per-use paradigm to new realms, and particularly to that of Information Technology (IT). This has given rise to the "on-demand" approach to electronic business (e-business). Incidentally, IT is one of the products or services fields that are most commonly perceived as non-core by companies. IT is therefore considered a fixed cost worthy of being minimized.

One of the IT fields where the on-demand billing approach is more attractive is that of web-oriented applications or Web services. Without any pretension of precision, a Web service or application service is a service that is made available to service users through the Internet, particularly the World Wide Web. A Web service typically consists of a collection of functions that can be exploited by other applications, through an interface defined in a standardized way, irrespective of the actual implementation of the offered functions. A Web service is accessed via ubiquitous protocols and data formats such as HTTP, SOAP, XML and the like. Web services have become the standard platform for application integration. Web services are the fundamental building blocks in the move to distributed computing on the Internet.

A possible scenario may be one in which a software vendor or Web service producer creates a service, implemented by software, of interest for one or more customer organizations. Customer organizations take advantage of the service use by third parties. The service is published and made available to potential service users through a host. The host makes the service run and is connected to a computer network, such as a Web application server in the Internet. One of the aims of the Web service producer is to charge the account and bill the correct customer organization whenever the Web service is exploited. By way of example, the Web service may be a ticket reservation system for an aviation company or other customer organization, hosted by a Web application server, allowing users to make online airline ticket reservations through the Internet. The aim of the Web service creator or of the host making it available is to charge the customer aviation company an agreed price whenever a user accesses the system and makes a ticket reservation. The web service creator and host may coincide.

More typically, the host hosts services for more than one customer organization. Each customer organization shall be properly charged for the exploitation of the respective services.

Thus, in order to correctly bill the different customer companies, it is very important for the service provider or host to detect to which customer company an exploited service refers.

Solutions known in the art are very unsatisfactory. In particular, sets of products and software packages are available to perform this task, but they are very expensive and technically complex to implement.

A rather straightforward way to enable on-demand Web service usage billing might call for including, in each Web service, some sort of counter that keeps track of the number of times the Web service is invoked, or the usage time.

However, this approach would pose great problems as far as the aspects of data maintenance and gathering are concerned.

OBJECTS AND SUMMARY OF THE INVENTION

An object of the present invention is to devise a solution to the problem of properly charging and billing the exploitation of on-demand services to the respective owners in a simple and efficient way. In essence, the invention proposes to slightly change the existing operation of the Web service hosts, so as to make them capable of performing an automatic accounting when a hosted Web service is accessed, for example before a request is redirected to an application server and the Web service request is serviced.

These and other objects are attained in accordance with one embodiment of the invention wherein there is provided a method for offering on-demand services to users of a computer network, comprising hosting at least one on-demand service at a host data processing system, receiving an incoming access request from a user, identifying the incoming access request as an on-demand service access request and updating on-demand service usage data indicative of usage of the on-demand service by the users, and offering the on-demand service.

In accordance with another embodiment of the invention, there is provided a host data processing system hosting at least one on-demand service intended to be offered to users of a computer network, comprising an HTTP server sub-system receiving incoming access requests from the users to both Web pages and the on-demand service, an application server sub-system servicing the on-demand service requests, an access request discriminator adapted to discriminate between Web page access requests and on-demand service access requests, and to divert the on-demand service access requests to the application server sub-system, on-demand service usage data indicative of usage of the on-demand service by the users, and a usage data updating module for updating the on-demand service usage data in response to an identification of an incoming access request as an on-demand service access request.

In accordance with another embodiment of the invention, there is provided a computer program product for offering on-demand services to users of a computer network comprising a computer readable medium, first program instruction means for hosting at least one on-demand service at a host data processing system, second program instruction means for receiving an incoming access request from a user, third program instruction means for identifying the incoming access request as an on-demand service access request, fourth program instruction means for updating on-demand service usage data indicative of usage of the on-demand service by the users and offering the on-demand service and wherein the first, second, third and fourth program instruction means are recorded on the medium.

DETAILED DESCRIPTION OF THE INVENTION

For a better understanding of the present invention together with other and further objects, advantages and capabilities thereof, reference is made to the following disclosure and the appended claims in connection with the above-described drawings.

Figure 1:
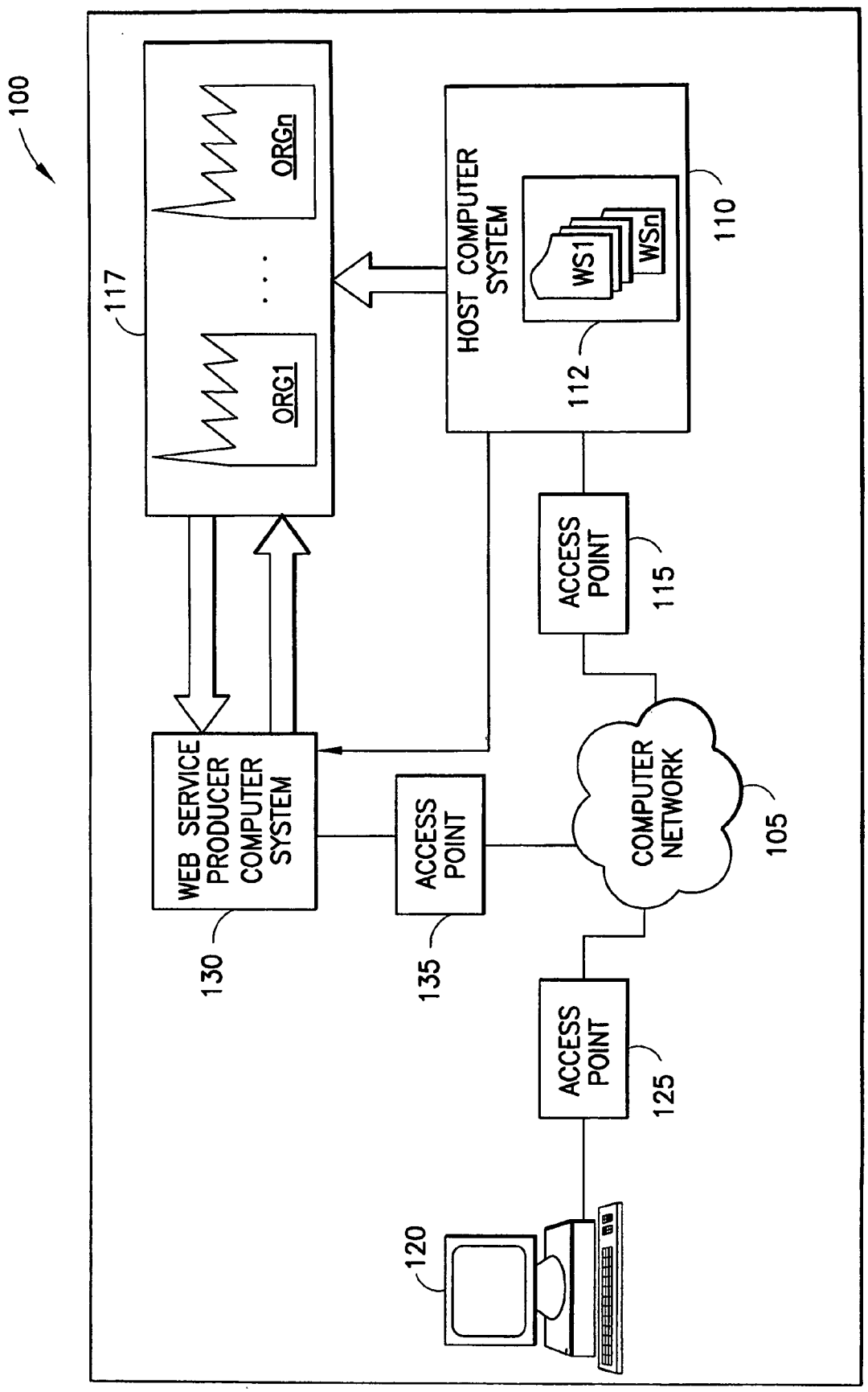
FIG. 1 shows a distributed data processing system according to an embodiment of the present invention.

Referring to FIG. 1, a distributed data processing system 100, comprises a computer network 105. Computer network 105 may be the Internet, a Local Area Network (LAN), a Metropolitan Area Network (MAN), a Wide Area Network (WAN), an Intranet and the like.

A host computer system 110 is connected to computer network 105 possibly through an access point 115. Host computer system 110 may be an on-demand Web service host. Access point 115 may be a gateway, a connection to a connectivity service provider, a direct connection and the like.

In particular, host computer system 110 is or includes a World Wide Web (WWW or Web) server or HTTP server, supporting data communications via Hypertext Transfer Protocol (HTTP), as do the multitude of computers within the Internet that host Hypertext Markup Language (HTML) Web pages. Web pages may be made available by host computer system 110 to users through computer network 105.

Host computer system 110 hosts and manages the execution of one or more Web-oriented applications or Web services 112. Each one of the Web services, WS1, . . . , WSn, are implemented and made available by host computer system 110 to users through computer network 105. It is assumed that each one, WS1, . . . , WSn, of the Web services 112 is hosted and managed by an application server and implemented, run and made available by host computer system 110 on behalf of a respective, generic customer organization 117. Each one of the customer organizations, ORG1, . . . , ORGn, may be of a different nature, such as an enterprise, a public administration agency, a company devoted to e-commerce, and the like.

Host computer system 110 makes Web services 112 available through computer network 105 to users exploiting data processing terminals such as personal computer 120. Data processing terminals may include personal computers, Personal Digital Assistants, WAP, GPRS or UMTS mobile phones and the like. Personal computer 120 is connected to computer network 105 via access point 125, Access point 125 may be an Internet connectivity service provider.

Through personal computer 120, the user can access a desired one, WS1, . . . , WSn, of the Web services 112 managed and made available by the application server of host computer system 110. For example, one of the Web services made available by host computer system 110 may be an on-line ticket reservation service for airline tickets run on behalf of an aviation company. The aviation company is one of the customer organizations ORG1, . . . , ORGn. Another Web service may be a weather forecasting service run on behalf of another customer organization. In general, the Web service 112 may be any service that can be made available on-line through the Internet, offered by any kind of organization 117 through host computer system 110.

Also shown in FIG. 1 is a computer system 130, connected to computer network 105 via an access point 135. Computer system 130 is the computer system of a Web service developer or producer that has developed and produced one or more of the Web services WS1, . . . , WSn, and that has made the Web services 112 exploitable by the customer organizations ORG1, . . . , ORGn, through host computer system 110, on an on-demand basis. One of the aims of the Web service producer is charging the accounts of and billing customer organizations 117 according to the actual exploitation of the Web services 112 by the users. It is pointed out that the Web service producer may in some cases own host computer system 110. In any case, the owner of host computer system 110 may have a similar aim of billing customer organizations 117 for the usage of the computation resources allocated for running the Web services 112. Alternatively, the owner of host computer system 110 may directly bill the Web service producer. This will sustain the costs of implementation of the Web services 112. These costs are thereafter billed to the customer organizations 117.

The physical structure of host computer system 110, the user's personal computer 120 and computer system 130 are not shown, nor described in further detail. These components will typically have the structure of a general purpose computer system, with suitable hardware and software resources, particularly data processors, memories and peripheral resources, for enabling communication with the access points 115, 125 and 135 and computer network 105. The user's personal computer 120 may have an analog, ISDN or ADSL modem and have suitable browsing software installed. The user's personal computer 120 may also be part of a local, private computer network such as a LAN forming the Intranet of a company.

Figure 2:
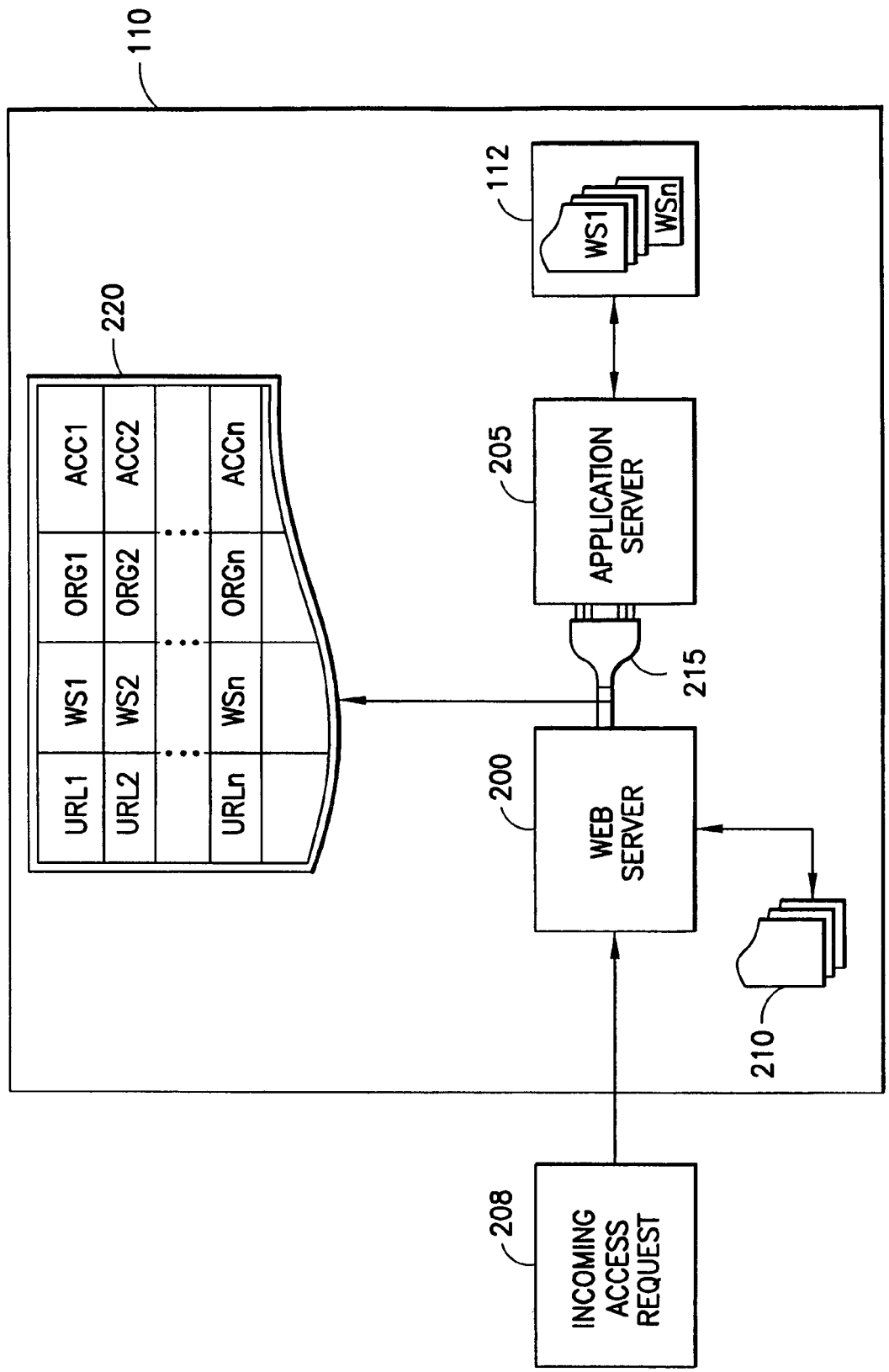
FIG. 2 is a block diagram of a host computer system according to an embodiment of the present invention.

Referring now to FIG. 2, host computer system 110 includes a Web server 200 and an application server 205. Web server 200 represents the subsystem of host computer system 110 that acts in particular as an HTTP server, managing data communications via the HTTP protocol and supporting HTML pages. Web server 200 more generally supports either static or dynamic Web pages, such as Java Server Pages (JSPs) and the like. Web server 200 receives incoming access requests 208 to Web pages 210 from computer network 105. Incoming access requests 208 may be identified by respective Universal Resource Locator (URL) codes. Web server 200 fetches the accessed pages and causes the pages to be downloaded to the user's personal computer 120.

Application server 205 hosts and manages the execution of the Web services 112. By way of description simplicity, it is assumed that each one of the Web services WS1, . . . , WSn hosted and managed by application server 205 corresponds to a respective one of the customer organizations ORG1, . . . , ORGn.

Similarly to Web pages, access requests to one of the Web services WS1, . . . , WSn include a URL identifying the selected Web service. A software module typically takes the form of a plug-in 215 of application server 205. Plug-in 215 normally performs the function of intercepting the incoming URLs to Web server 200, so as to detect whether the currently received URL corresponds to a Web service WS1, . . . , Wsn or to a Web page. This control allows host computer system 110 to determine whether the incoming access request 208 is to be serviced by Web server 200 or application server 205. If application server plug-in 215 identifies that the incoming URL corresponds to a Web service 112, it diverts the requested URL to application server 205. Application server 205 will manage the Web service request, thereby preventing the Web server 200 from interpreting the incoming request as an access request to a Web page, which will cause an error.

According to an embodiment of the present invention, plug-in 215 is modified for managing the accounting of the Web service exploitation. Plug-in 215 manages a database 220. Database 220 may be a configuration file. Database 220 stores URLs, URL1, URL2, . . . , URLn, corresponding to the different Web services, WS1, . . . , Wsn. For each of these URLs, database 220 also stores an identifier of the Web service, WS1, WS2, . . . , Wsn (e.g., the Web service identifier code), the organization, ORG1, ORG2, . . . , ORGn, on behalf of which the Web service is hosted, and accounting data, ACC1, ACC2, . . . , ACCn, which are constantly kept updated by plug-in 215, and are useful for determining the usage of the Web service by the users (such as by the user's personal computer 120) and for determining the amount to be billed to the customer organization, ORG1, ORG2, . . . , ORGn, normally on the basis of an agreed price.

Figure 3:
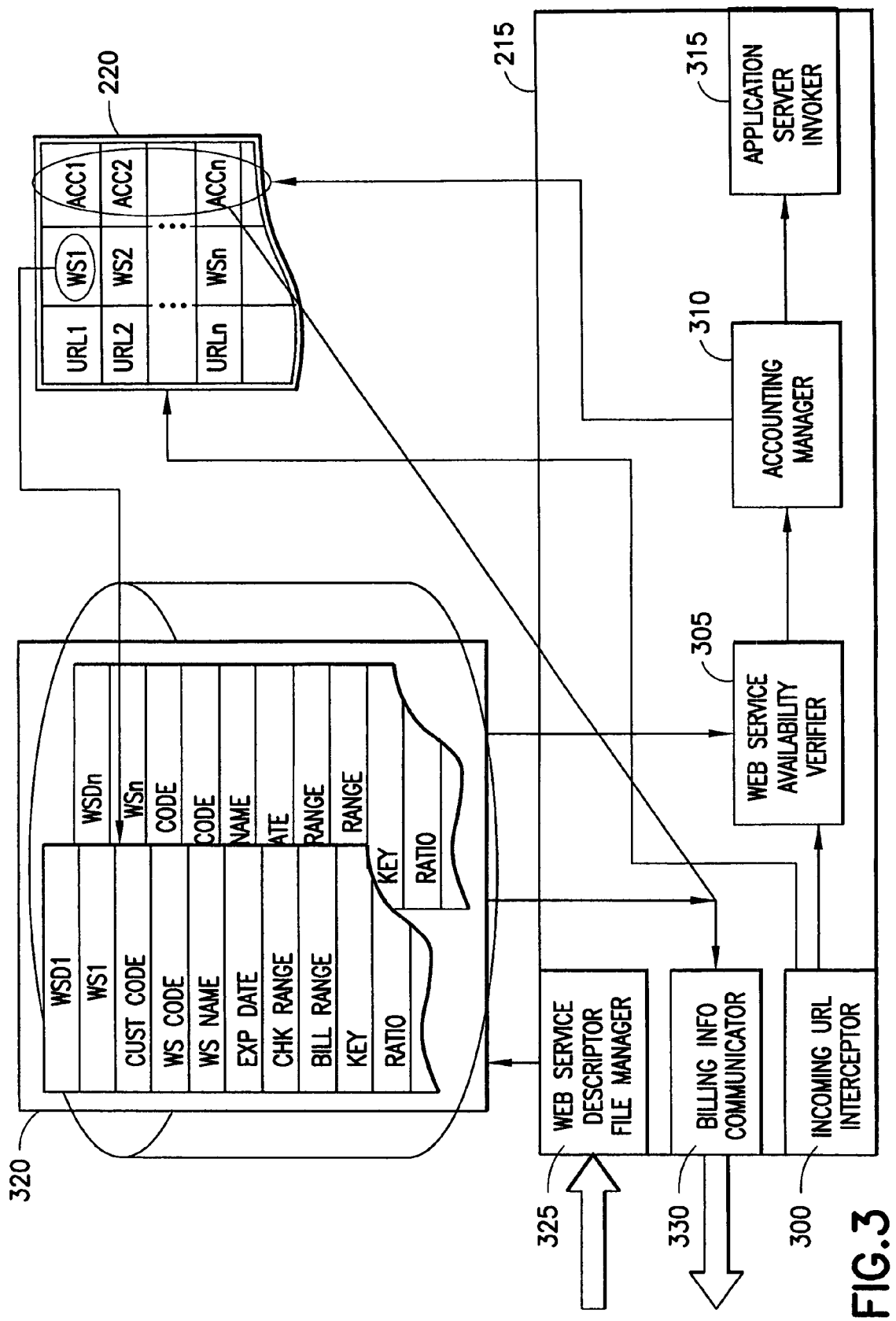
FIG. 3 is a block diagram of an application server plug-in according to an embodiment of the present invention.

FIG. 3 shows a block diagram of plug-in 215 according to one embodiment of the present invention. An incoming URL interceptor module 300 intercepts the URLs associated with the access requests incoming to Web server 200. A Web service availability verifier module 305 verifies the availability of a requested Web service. An accounting manager module 310 manages the accounting of the Web service usage, keeping the database 220 updated. An application server invoker module 315 invokes application server 205 for the execution of the Web service.

In order to ascertain the availability of a requested Web service, Web service availability verifier module 305 exploits information contained in a Web service descriptor file 320, specific for that Web service. According to one embodiment of the present invention, a generic Web service descriptor file WSD1, . . . , WSDn is an XML file including data such as: the Web service identifier code WS1, . . . , WSn; a Web service description (field WS NAME), containing a description of the Web service; a customer organization code (field CUST CODE) allowing to univocally identify the customer organization ORG1, ORG2, . . . , ORGn on behalf of which the Web service is hosted; and data adapted to establish an expiration date (field EXP DATE) after which the Web service is no longer available.

In a preferred embodiment of the present invention, the Web service descriptor file WSD1, . . . , WSDn additionally includes data (contained in a field CHK RANGE) adapted to establish a periodicity by which a Web service descriptor file manager module 325 of plug-in 215 updates the Web service descriptor file WSD1, . . . , WSDn, particularly as far as the expiration date is concerned. For example, Web service descriptor file manager module 325, according to the periodicity specified in the Web service descriptor file WSD1, . . . , WSDn, periodically gets information (for example, from the Web service producer) concerning the expiration date of the Web service. Web service descriptor file manager module 325 accordingly updates the proper field EXP DATE in the descriptor file. For example, a suitable remote Web service is exploited to this end by the Web service descriptor file manager module 325, such a remote Web service being for example hosted in the computer system 130 of the Web service producer.

Also, in a preferred embodiment of the present invention, the Web service descriptor file WSD1, . . . , WSDn includes data (contained in a field BILL RANGE) adapted to establish a periodicity by which a billing information communicator module 330 communicates to the Web service producer computer system 130 (for example exploiting a suitable remote Web service hosted therein) the Web service usage data ACC1, . . . , ACCn from which the Web service producer can bill the customer organization.

The generic Web service descriptor file WSD1, . . . , WSDn may additionally include information such as an access key to the Web service (field KEY), storing an access key that the user is requested to enter in order to be granted access to the Web service, and data (field RATIO) specifying the content of a possible message sent to the user when access to a desired Web service is denied.

Figure 4A:
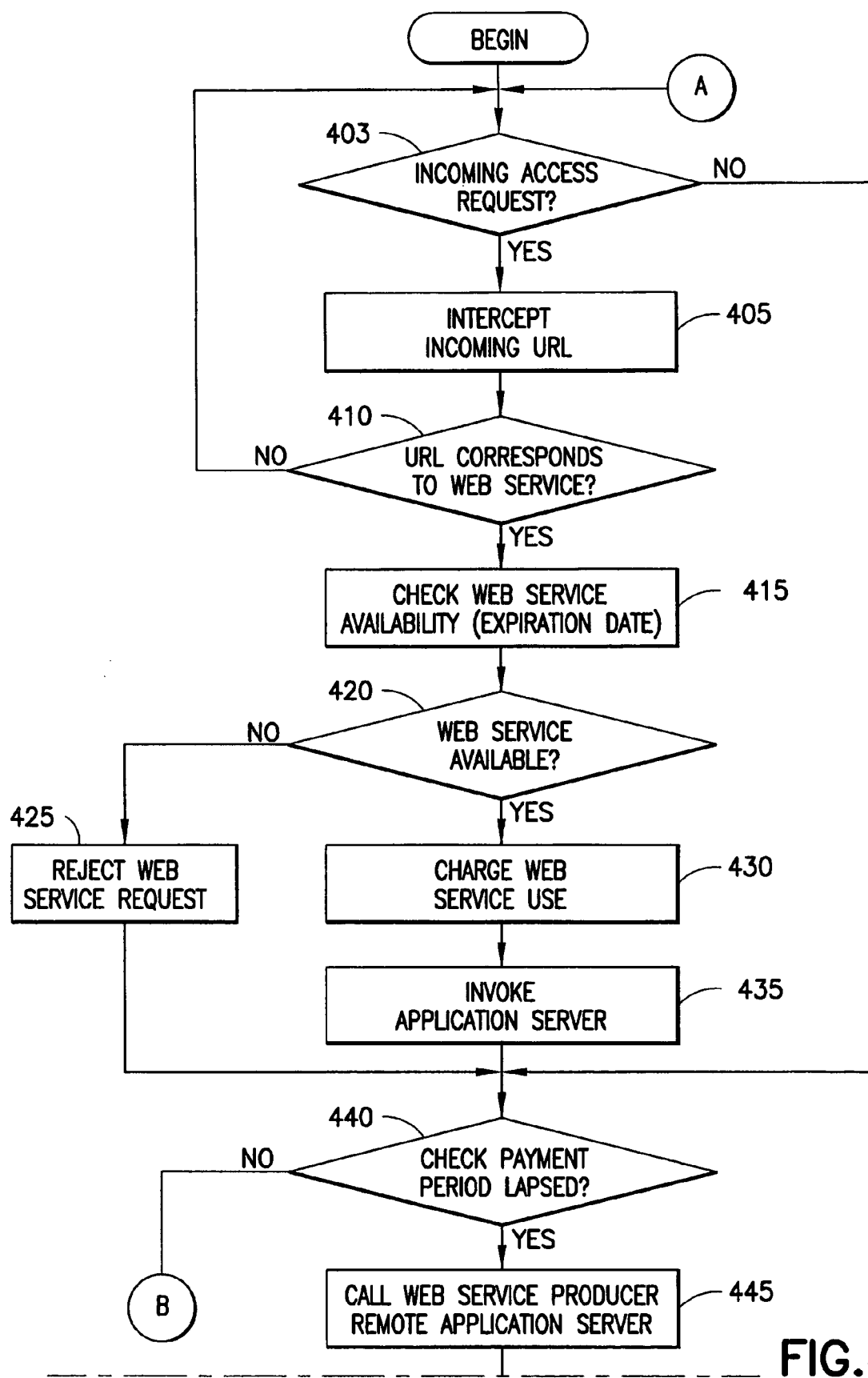
FIG. 4 is a flowchart illustrating the main steps of a method implemented by an application server plug-in according to an embodiment of the present invention.

FIG. 4 shows a simplified flowchart illustrative of the operations performed by plug-in 215 according to an embodiment of the present invention.

Specifically, plug-in 215 constantly listens to Web page access requests incoming to Web server 200 (step 403). In case an access request is detected (exit branch Y of step 403) Incoming URL interceptor module 300 intercepts the incoming URLs (step 405).

Incoming URL interceptor module 300 checks the intercepted URLs to ascertain whether they correspond to Web services (step 410), for example by looking at database 220. In the negative case (exit branch N of step 410), the access request is to a Web page, and is serviced by Web server 200. On the contrary (exit branch Y of step 410), the access request is diverted from Web server 200 to application server 205. However, according to an embodiment of the present invention, before passing the access request to application server 205, plug-in 215 checks the availability of the invoked Web service (step 415). To this purpose, the Incoming URL interceptor module 300 passes the intercepted URL to Web service availability verifier 305. Web service availability verifier 305, using the received URL, retrieves the corresponding Web service identifier WS1, . . . , Wsn from database 220. Such an identifier is used by the Web service availability verifier 305 as a key for accessing the database of Web service descriptor files 320, and for retrieving from the proper file the information adapted to establish the Web service availability, for example the expiration date, EXP DATE.

By comparing the retrieved expiration date to the current date, Web service availability verifier 305 is capable of determining whether the Web service is available or not (step 420). In the negative case (exit branch N of step 420), the Web service request is generically rejected (step 425). On the contrary, if the requested Web service is ascertained to be available, for example because the expiration date has not yet been reached (exit branch Y of step 420), accounting manager module 310 charges the Web service for the current use instance (step 430), updating the proper value ACC1, . . . , ACCn in the database 220. For example, the value ACC1, . . . , ACCn may be incremented by one. It is stressed that the specific nature of and the way the accounting data are modified is not limitative to the present invention. Other, more complex charging schemes may be adopted, taking, for example, into consideration not only the mere invocation of the Web service, but also the time the Web service is exploited.

Then, application server invoker module 315 invokes application server 205, which services the Web service request (step 435).

Plug-in 215 then performs routine actions, directed among other things to keeping the Web service descriptor files updated. It is pointed out that, in the invention embodiment described herein, these actions are however performed repeatedly, as schematized by the exit branch N of step 403, and not only in occasion of the invocation of a Web service.

Specifically, Web service descriptor file manager module 325 checks whether it is time for updating the data in the Web service descriptor file relating to the Web service availability. In particular, Web service descriptor file manager module 325 ascertains whether, from the time of the last updating, the period specified in the file field CHK RANGE lapsed (step 440). In the affirmative case (exit branch Y of step 440), Web service descriptor file manager module 325 gets, for example by the Web service producer, information concerning the regular payment of the Web service usage by the proper customer organization. To this purpose, Web service descriptor file manager module 325 calls a remote service application hosted in the computer system 130 of the Web service producer (step 445), and checks whether the Web service usage has been regularly paid (step 450). In the affirmative case (exit branch Y of step 450) Web service descriptor file manager module 325 receives from the Web service producer computer system 130 a new expiration date (step 455), which Web service descriptor file manager module 325 uses to replace the previous expiration date in the Web service descriptor file (step 460), possibly together with a new key to be stored in the field KEY of the Web service descriptor file. In the negative case (exit branch N of step 450), the expiration date is not updated, so that when the current date reaches the expiration date, the Web service becomes unavailable.

As another routine action, billing information communicator module 330 checks whether it is time for communicating data to the Web service producer useful for billing the Web service usage. In particular, Web service descriptor file manager module 325 ascertains whether, from the last time the billing information has been sent, the period specified in the file field BILL RANGE lapsed (step 465). In the affirmative case (exit branch Y of step 465), billing information communicator module 330 retrieves, from the database 220, the Web service usage accounting data ACC1, . . . , ACCn, calls a service application hosted in computer system 110, and sends the accounting information to the computer system 130 of the Web service producer (step 470), which can thus bill the proper customer organization ORG1, . . . , ORGn.

The operation flow then jumps back to the beginning (connector A).

The practical implementation of the invention embodiment described in the foregoing is rather simple and not at all invasive. In fact, it is sufficient to slightly modify the conventional plug-ins already provided in Web service host systems for diverting access requests towards the application server. No changes need to be made to system elements outside the host managing the execution of the Web service.

Another advantage of the invention embodiment described is that it can be applied to any Web service, of whatever nature. The solution is application-independent. It can be applied to any Web server, without requiring redefinitions of existing software or hardware architectures. This makes the present invention particularly suitable for the application in small to medium environments, which may desire to move to an on-demand e-business implementation without having to redesign their IT infrastructure.

Figure 5:
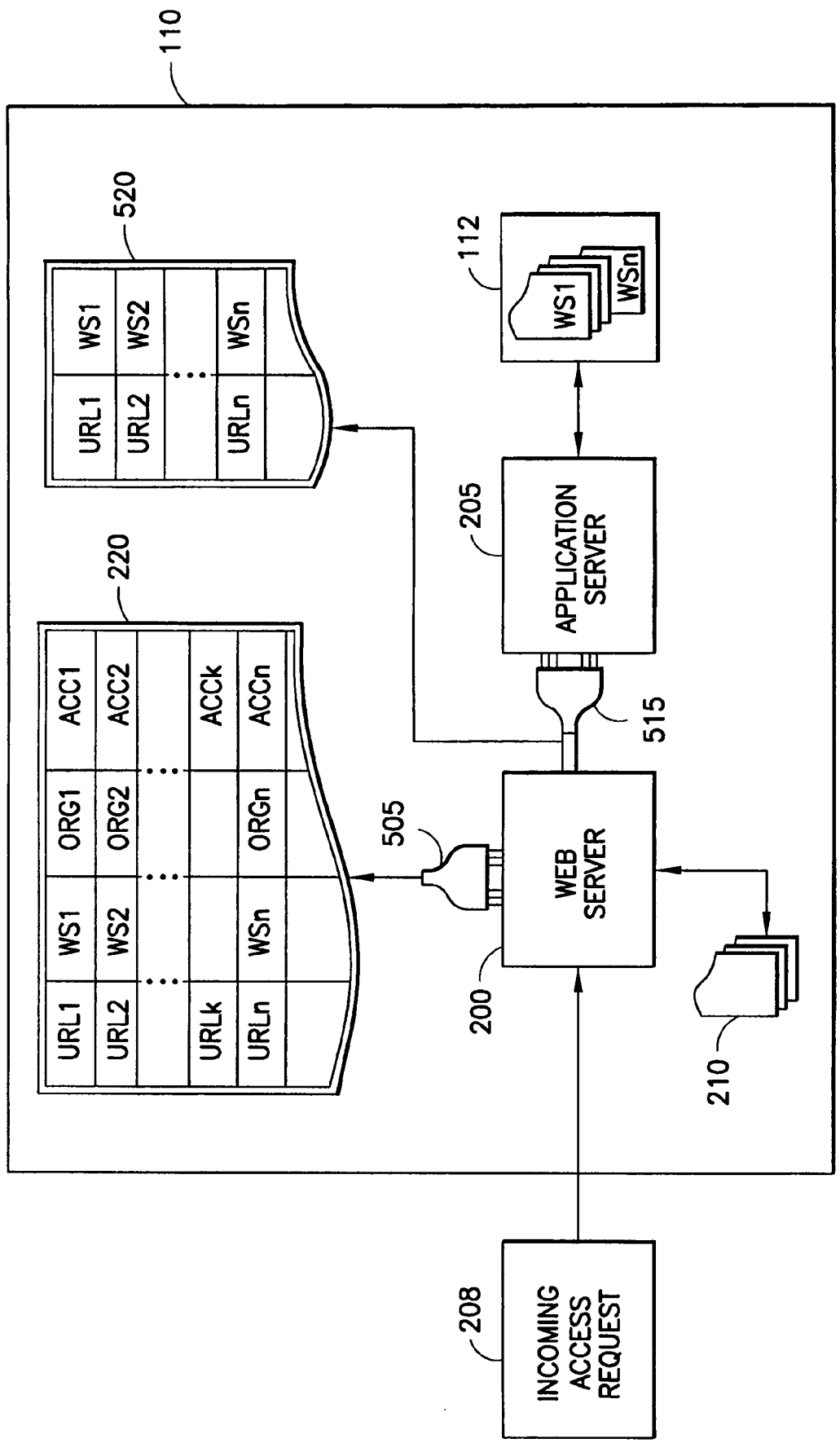
FIG. 5 is a block diagram of a host computer system according to an alternative embodiment of the present invention.

FIG. 5 shows an alternative embodiment of the present invention, in which no substantial changes need to be made to an existent plug-in 515 that is provided for intercepting URLs corresponding to Web services, and diverting the access requests thereto from Web server 200, on the basis of a correspondence table 520 between URLs, URL1, . . . , URLn and Web services WS1, . . . , Wsn. Instead, according to this alternative embodiment, the engine of Web server 200 is modified compared to a conventional Web server, so as to be able to implement an accounting procedure at least in respect of the invocation of the Web services. In particular, in one embodiment of the present invention, the modifications of Web server 200 may take the form of a plug-in 505. Plug-in 505 may be an extension of existing Web servers, capable of intercepting incoming URLs, and, for example, on the basis of Web service descriptor files similar to the files WSD1, . . . , WSDn shown in FIG. 3, performing a similar procedure as the one described in the foregoing, for keeping updated the database 220, or a similar database, storing the accounting data ACC1, ACC2, . . . , ACCn useful for determining the usage of the Web service by the users and thus the amount to be billed to the customer organization ORG1, ORG2, . . . , ORGn.

It is observed that in this alternative embodiment of the invention, the modified Web server, for example plug-in 505 may for implementation simplicity be non-selective towards the URLs corresponding to the Web services, and the accounting be performed automatically and for any URL, even if relating to Web pages. Incidentally, this by-product of the Web service usage accounting procedure may prove useful, for example, for charging a Web page owner on the basis of the accesses to the Web pages hosted by host computer system 110.

This alternative solution preserves substantially all the advantages cited in connection with the previous invention embodiment.

In conclusion, the present invention provides a way by which an accounting and billing system for on-demand Web-related services (e.g., e-business services) can be easily but effectively implemented.

For example, although in the described embodiments the accounting procedure is implemented by plug-ins of the Web server or of the application server, this is not to be construed as a limitation, merely as a preferred, non-invasive way of implementing the invention. In alternative embodiments, the Web server or application server engines may be modified for enabling them to carry out the desired accounting procedure.

For example, in an alternative embodiment of the invention the accounting procedure may be accomplished after the application server is invoked and the Web service rendered.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method for offering on-demand services to users of a computer network, comprising:

hosting at least one on-demand service at a host data processing system; receiving an incoming access request from a user; identifying said incoming access request as an on-demand service access request;

updating on-demand service usage data indicative of usage of said on-demand service by said users;

holding via a computer said on-demand service usage data associated with information identifying an on-demand service customer to be charged for any usage of said on-demand service by said users; and using said on-demand service usage data to bill said on-demand service customer for any on-demand service usage by said users, and offering said on-demand service.

2. The method according to claim 1 wherein said host data processing system comprises an HTTP server sub-system and an application server sub-system, said incoming access request is received at said HTTP server sub-system and said identifying step causes said incoming access request to be diverted to said application server sub-system.

3. The method according to claim 2 wherein said identifying step is performed by a plug-in of said application server sub-system, said plug-in being adapted to intercept said incoming access request received at said HTTP server sub-system and, invoking said application server sub-system if said incoming access request is identified to be an on-demand service access request.

4. The method according to claim 3 wherein said plug-in also performs said updating step.

5. The method according to claim 3 wherein said updating step is performed by said HTTP server sub-system.

6. The method according to claim 5 wherein said HTTP server sub-system also receives access requests to Web pages and updates usage data of both said on-demand service and said Web pages.

7. The method according to claim 1 including a step of receiving at said host computer processing system information adapted to establish that usage of said on-demand service has been paid by said on-demand service customer, and conditioning offering said on-demand service to payment of on-demand service usage.

8. The method according to claim 1 including a step of providing, for each of said at least one on-demand service, a respective descriptor file, said descriptor file containing data descriptive of said on-demand service, said descriptive data including data adapted to establish that usage of said on-demand service has been paid by said on-demand service customer.

9. The method according to claim 8 wherein said data adapted include an on-demand service expiration date.

10. The method according to claim 9 including a step of checking said on-demand service expiration date before offering said on-demand service.

11. The method according to claim 10 wherein said descriptive data in said descriptor file further includes data establishing a periodicity according to which payment of usage of said on-demand service by said on-demand service customer is to be assessed.

12. The method according to claim 11 wherein said descriptive data in said descriptor file further includes an accession key to be provided to said host computer processing system for accessing said on-demand service.

13. The method according to claim 12 including a step of updating said on-demand service expiration date and said accession key when payment of usage of said on-demand service by said on-demand service customer is assessed.

14. The method according to claim 8 wherein said descriptive data in said descriptor file further includes data establishing a periodicity according to which said on-demand service usage data are communicated to a customer billing entity.

15. The method according to claim 8 wherein said descriptor file is an XML file.

* * * * *